(12) United States Patent
Bahmata et al.

(10) Patent No.: US 11,125,288 B2
(45) Date of Patent: Sep. 21, 2021

(54) DISC BRAKE SYSTEM

(71) Applicant: AKEBONO BRAKE INDUSTRY CO., LTD., Tokyo (JP)

(72) Inventors: Aurelian Bahmata, South Lyon, MI (US); Michio Suzuki, Kuki (JP); Brian Lewis Boyle, Farmington Hills, MI (US); Gang Lou, Rochester, MI (US); Waleed Mahmoud Al-Mahshi, Novi, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 1 day.

(21) Appl. No.: 16/545,367

(22) Filed: Aug. 20, 2019

(65) Prior Publication Data

US 2020/0063811 A1 Feb. 27, 2020

Related U.S. Application Data

(60) Provisional application No. 62/724,808, filed on Aug. 30, 2018, provisional application No. 62/720,280, filed on Aug. 21, 2018.

(51) Int. Cl.
| | |
|---|---|
| *F16D 55/00* | (2006.01) |
| *F16D 65/00* | (2006.01) |
| *F16D 55/227* | (2006.01) |
| *F16D 121/04* | (2012.01) |

(52) U.S. Cl.
CPC ....... *F16D 65/0068* (2013.01); *F16D 55/227* (2013.01); *F16D 2055/0016* (2013.01); *F16D 2121/04* (2013.01)

(58) Field of Classification Search
CPC .......... F16D 55/226–228; F16D 65/02; F16D 65/66; F16D 65/0068
USPC .......... 188/72.2, 72.5, 73.31, 106 P
See application file for complete search history.

(56) References Cited

U.S. PATENT DOCUMENTS

| | | | |
|---|---|---|---|
| 2,951,561 A * | 9/1960 | Davis | F16D 65/095 188/72.5 |
| 3,285,372 A | 11/1966 | Rossmann | |
| 3,767,017 A * | 10/1973 | Maurice | F16D 55/2262 188/72.5 |
| 3,835,960 A | 9/1974 | Moss | |
| 3,835,961 A | 9/1974 | Troester et al. | |
| 4,719,997 A | 1/1988 | Tsuruta | |
| 4,784,245 A | 11/1988 | Fabbro et al. | |
| 5,038,895 A | 8/1991 | Evans | |
| 5,168,963 A * | 12/1992 | Poncini | B60T 1/065 188/106 P |
| 5,172,792 A | 12/1992 | Cartwright et al. | |

(Continued)

FOREIGN PATENT DOCUMENTS

| | | |
|---|---|---|
| DE | 1959081 A1 | 6/1971 |
| DE | 3332548 A1 | 3/1985 |

(Continued)

*Primary Examiner* — Christopher P Schwartz
(74) *Attorney, Agent, or Firm* — The Dobrusin Law Firm, P.C.

(57) ABSTRACT

A disc brake system that is an opposed piston brake system. The disc brake system includes a brake caliper having an inboard side and an outboard side. The inboard side of the brake caliper is configured to support more brake pistons than the outboard side of the brake caliper.

20 Claims, 10 Drawing Sheets

(56) References Cited

U.S. PATENT DOCUMENTS

| | | | | |
|---|---|---|---|---|
| 5,464,077 | A | * | 11/1995 | Thiel ..................... F16D 55/227 188/72.5 |
| 5,477,944 | A | * | 12/1995 | Bryan ..................... F16D 55/22 188/250 B |
| 5,620,063 | A | * | 4/1997 | Smith ..................... F16D 55/228 188/240 |
| 5,921,354 | A | * | 7/1999 | Evans ................. F16D 55/2245 188/72.2 |
| 6,000,506 | A | * | 12/1999 | Warwick ............... F16D 55/228 188/1.11 W |
| 6,382,368 | B2 | | 5/2002 | Iwata et al. |
| 6,651,785 | B2 | * | 11/2003 | Cornolti ................ F16D 65/092 188/250 B |
| D555,555 | S | * | 11/2007 | Ikuzawa ...................... D12/180 |
| 7,926,625 | B2 | * | 4/2011 | Kawai ................... F16D 55/228 188/72.5 |
| 8,544,613 | B2 | * | 10/2013 | Cantoni ............... F16D 55/2262 188/73.31 |
| 8,783,423 | B2 | * | 7/2014 | Schrewe ................. F16D 65/18 188/72.5 |
| 8,851,241 | B2 | | 10/2014 | Pericevic et al. |
| 9,989,115 | B2 | * | 6/2018 | Suzuki .................. F16D 65/183 |
| 2002/0003067 | A1 | | 1/2002 | Iwata et al. |
| 2006/0124404 | A1 | * | 6/2006 | Morais .................. F16D 55/228 188/71.1 |
| 2008/0283345 | A1 | | 11/2008 | Balz et al. |
| 2012/0292141 | A1 | | 11/2012 | Takahashi |
| 2013/0075205 | A1 | | 3/2013 | Sakashita et al. |
| 2014/0131147 | A1 | | 5/2014 | Schnur et al. |
| 2015/0129371 | A1 | | 5/2015 | Gutelius et al. |
| 2015/0219171 | A1 | | 8/2015 | Kawamata et al. |
| 2015/0323026 | A1 | | 11/2015 | Yasui et al. |
| 2016/0238094 | A1 | * | 8/2016 | Gutelius ............... F16D 55/225 |
| 2017/0058979 | A1 | * | 3/2017 | Bahmata ............... F16D 55/226 |

FOREIGN PATENT DOCUMENTS

| | | |
|---|---|---|
| EP | 2937599 A1 | 10/2015 |
| EP | 3128199 A1 | 2/2017 |
| GB | 1156277 A | 6/1969 |
| JP | H0960667 A | 3/1997 |
| JP | 2002021892 A | 1/2002 |
| JP | 2007177995 A | 7/2007 |
| JP | 2011158058 A | 8/2011 |
| JP | 2012246988 A | 12/2012 |
| JP | 2015124811 A | 7/2015 |
| JP | 2015124812 A | 7/2015 |
| WO | 92/20937 A1 | 11/1992 |
| WO | 2007/051809 A1 | 5/2007 |
| WO | 2017/024313 A1 | 2/2014 |
| WO | 2015/098780 A1 | 7/2015 |
| WO | 2015/152074 A1 | 10/2015 |
| WO | 2017/032988 A1 | 3/2017 |

* cited by examiner

DISC BRAKE SYSTEM

PRIORITY

This application claims priority to and the benefit of: U.S. 62/720,280 filed Aug. 21, 2018 and U.S. 62/724,808 filed Aug. 30, 2018, both of which are incorporated by reference herein for all purposes.

FIELD

These teachings relate to an opposed piston brake system.

BACKGROUND

Brake systems can be used to slow, stop, or prevent movement of a brake rotor or road wheel.

One type of brake system is an opposed piston brake system, which includes one or more brake pistons that oppose each other (i.e., the brake pistons are supported on both sides of the brake rotor). During a braking event, whether for service braking or for park braking, a pair of pads are pushed against a corresponding side of the brake rotor by the opposed brake pistons.

Improvements in brake systems, including opposed piston brake systems, may be desired.

SUMMARY

These teachings provide an improved disc brake system; an improved parking brake system; and an improved combined disc brake system and parking brake system.

These teaching provide a disc brake system comprising a brake caliper; a first brake pad supported by the brake caliper, and a second brake pad supported by the brake caliper; and a pin connected to both the first brake pad and the second brake pad. One or both of the brake pads move or slide along the pin during a brake apply. In some configurations, the brake system may be free of any pins for supporting the brake pads. The brake caliper comprises an inboard side and an outboard side. The bolt that is configured to connect together the inboard side and the outboard side.

These teaching provide a disc brake system comprising a brake caliper; a first brake pad supported by the brake caliper, and a second brake pad supported by the brake caliper; and a pin connected to both the first brake pad and the second brake pad. One or both of the brake pads move or slide along the pin during a brake apply. A cross sectional shape of the pin is other than a circle.

These teaching provide a disc brake system comprising a brake caliper comprising a leading end and an opposing trailing end, and a first side and an opposing second side; and a parking brake system comprising a bridge extending across the first side and the second side. The first side may be an inboard side, and the second side may be an outboard side, or vice versa. The bridge is centered between the leading end and the trailing end such that the disc brake system is symmetrical between the leading end and the trailing end. In some configurations, the bridge may be offset towards either the front or leading end or the rear or trailing end.

These teaching provide a disc brake system comprising: a brake caliper comprising a leading end and an opposing trailing end, and a first or inboard side and an opposing second or outboard side; and a parking brake system. The first side and the second side are separate pieces that are joined together with one or more fasteners.

These teaching provide a disc brake system comprising: a brake caliper; a brake pad supported by the brake caliper; and a parking brake system comprising a bridge extending across a first side and a second side of the brake caliper. The bridge may comprise fingers, and the fingers and the brake pad may be integrated, which means the fingers and the brake pad are connected together by way of one or more mechanical fasteners, or the fingers and the pressure plate are made from a single common material.

These teaching provide an opposed piston disc brake system comprising: a brake caliper comprising two or more brake pistons supported at an inboard side of the brake caliper and two or more brake pistons supported at an outboard side of the brake caliper; and a parking brake system. The parking brake system is configured to move two or more of the brake pistons at the outboard side of the brake caliper during a parking brake apply.

These teachings provide a brake system that includes a brake caliper having an inboard side and an outboard side. The inboard side of the brake caliper is configured to support more brake pistons than the outboard side of the brake caliper.

These teachings also provide an opposed piston brake system that includes a brake caliper having an inboard side and an outboard side. The outboard side is configured to support only one brake piston, while the inboard side is configured to support more than one brake piston. The outboard side is free of a brake piston that is located directly across from the brake piston supported at the inboard side.

These teachings further provide an opposed piston brake system that includes a brake caliper having an inboard side and an outboard side. The outboard side is configured to support only one brake piston, while the inboard side is configured to support only two brake pistons.

By having a brake system with less brake pistons supported at the inboard side of the brake caliper, the brake system is lighter, less costly, and may be easier and faster to assemble and/or service.

An opposed piston brake system comprising: a brake caliper comprising an inboard side and an outboard side, wherein the inboard side is configured to support more than one brake piston, and the outboard side is configured to support only one brake piston.

The outboard side is free of a brake piston that is located directly across from the brake piston supported at the inboard side.

An opposed piston brake system comprising: a brake caliper comprising an inboard side and an outboard side, wherein the inboard side is configured to support more than one brake pistons, and wherein the outboard side is configured to support only one brake piston.

A disc brake system comprising: a brake caliper; a first brake pad supported by the brake caliper, and a second brake pad supported by the brake caliper; and wherein the brake caliper comprises an inboard side and an outboard side, and wherein a bolt is configured to connect together the inboard side and the outboard side.

A disc brake system comprising: a brake caliper comprising a leading end and an opposing trailing end, and a first side and an opposing second side; and a parking brake system comprising a bridge extending across the first side and the second side; wherein the bridge is centered between the leading end and the trailing end such that the disc brake system is symmetrical between the leading end and the trailing end.

An opposed piston disc brake system comprising a brake caliper that is free of a middle bridge that extends between the first side and the second side of the brake caliper.

A brake system comprising: a brake caliper; and a brake pad supported by the brake caliper, the brake pad comprises a plurality of brake pad sections, and wherein the brake system comprises a plurality of pins configured to support the brake pad sections. The brake system comprises three pad sections and four pins.

An opposed piston disc brake system comprising a ball nut assembly configured to move a brake piston during the parking brake apply.

An opposed piston brake system comprising: a brake caliper; and a parking brake system, the parking brake system comprising a bridge with fingers, wherein the fingers are configured to surround two brake pistons The opposed piston disc brake system according to claim 10, wherein at least two pins for supporting brake pistons are provided between the fingers.

An opposed piston brake system comprising: a brake caliper; and a parking brake system, the parking brake system comprises a spot caliper located at a leading end of the brake caliper and a trailing end of the brake caliper.

A disc brake system comprising: a brake caliper; a brake pad supported by the brake caliper; and a parking brake system comprising a bridge extending across a first side and a second side of the brake caliper, the bridge comprises fingers; wherein the fingers and the brake pad are integrated.

A brake system comprising a brake caliper; and a shaft configured to extend through or above a brake rotor; the shaft is connected to an outboard brake pad.

A brake system comprising: a brake caliper; and a shaft configured to extend through or above a brake rotor; the shaft is connected to an outboard brake pad. During a brake apply or a parking brake apply, rotation of the shaft causes the outboard brake pad to move towards the brake rotor to create a clamping force. Rotation of the shaft causes an inboard brake pad to move towards the brake rotor to create the clamping force.

DETAILED DESCRIPTION

Figure 1A:
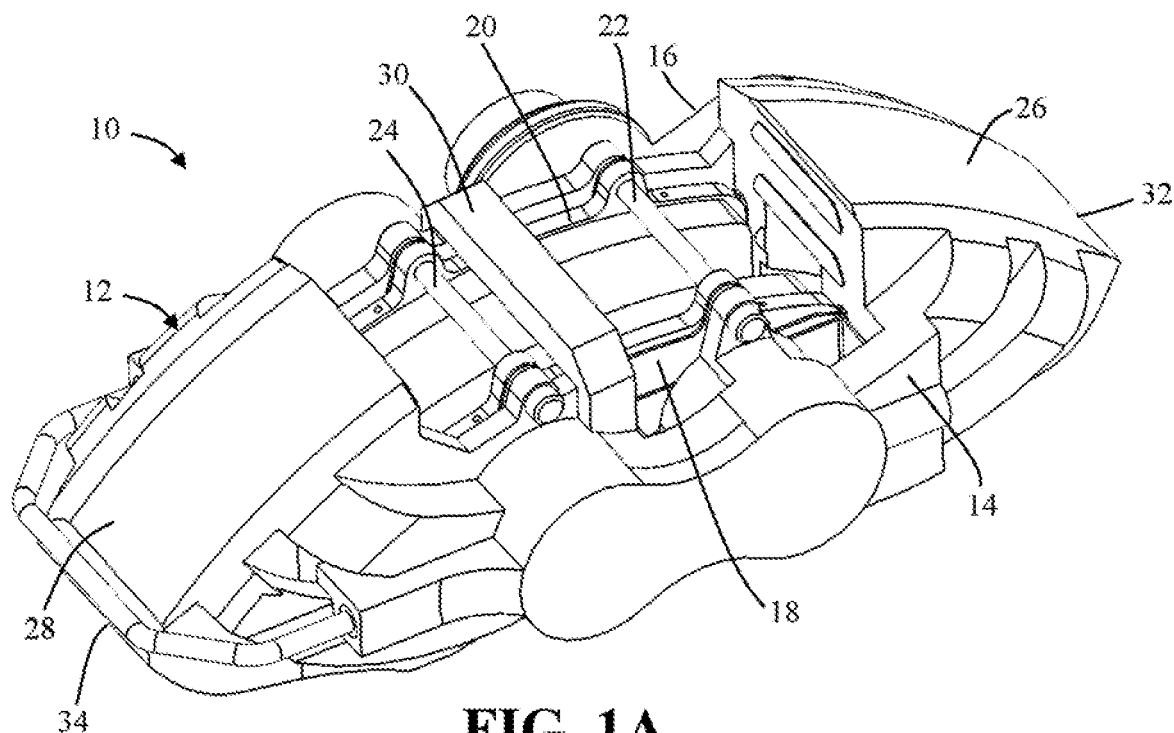
FIG. 1A is a perspective view of a brake system.

The teachings herein provide a brake system. The brake system may function to create a clamp force to slow, stop, and/or maintain a vehicle in a stopped or parked position. The brake system may be an opposing brake system (i.e., a fixed caliper brake system). These teachings provide a combined fixed caliper portion and a floating caliper portion. While these teachings provide for the fixed caliper portion to be used for service braking and the floating caliper portion to be used for parking braking, in some configurations the fixed caliper portion can be used for parking braking and/or the floating brake portion may be used for service braking.

The parking brake system may include one or more rotary to linear stage mechanisms. The rotary to linear stage mechanism may function to receive a rotary force or torque and then transfer the rotary force or torque into an axial or linear force. The rotary to linear stage mechanism may move a brake piston so that the brake piston moves a brake pad.

The rotary to linear stage mechanism may include a spindle and a nut. The rotary to linear stage mechanism may be at least partially located within a brake piston of the brake system. The rotary to linear stage mechanism may include a ball screw, roller screw. The rotary to linear stage mechanism may be a self-locking spindle and nut.

Exemplary ball screws may utilize ball bearings as load transfer elements between the nut and spindle or screw. During movement of the ball screw, the ball bearings may circulate along races or grooves between the spindle and the nut. A roller screw or planetary screw may be similar to a ball screw except that roller screws use rollers as the load transfer elements between nut and screw. The load on a ball screw, the roller screw, or both is distributed over a large number of ball bearings or rollers, via roller threads, respectively, so that each ball bearing or roller, when subjected to force, may roll, and therefore, friction is reduced, which may equate to high efficiency. Accordingly, less force or torque may be required to move a spindle and nut in a ball screw or roller screw in an apply direction, a release direction, or both.

The torque generating mechanism may be any suitable motor for creating a force or torque. For example, the motor may be a DC motor, a brushless motor, a series-wound motor, a shunt wound motor, a compound wound motor, a separately exited motor, a servomotor, a stepping motor, or a permanent magnet motor The torque generating mechanism may include a motor gear unit (MGU) may include one or more gears or gear trains that may function to transfer, increase, and/or decrease a power output or torque of the motor.

The torque generating mechanism may be an actuator that may be moved to provide torque to the rotary to linear stage mechanism. The actuator may be moved to provide torque to rotate the rotary to linear stage mechanism. Movement or rotation of the actuator may function to move the rotary to linear stage mechanism, a spindle, a shaft, one or more brake pistons, one or more brake pads, the fingers, or a combination thereof to create and/or release the clamp force. The actuator may be moved or rotated by a cable pull. Preferably, the actuator may be moved or rotated by a user manually manipulating a cable or a lever.

The clamp force or clamping force may be any force that, when coupled with a brake pad coefficient of friction, functions to create drag to decelerate, slow, stop, and/or prevent movement or rotation of a brake rotor and/or a vehicle. The clamp force may be created during a standard or service brake apply (i.e., a brake apply force). The clamp force may be created during a parking brake apply (i.e., a parking brake force). One or more brake pads may be used to create the clamp force. The same one or more brake pads are used to create the clamp force during application of the service brake and during application of the parking brake. The clamp force generates friction with generates heat.

The one or more brake pads may include a friction material and a pressure plate. The one or more brake pads may be supported on the brake caliper so that the friction material faces a side of the brake rotor. The pressure plate may oppose the friction surface.

One or more brake pistons, one or more grasping members fingers, or both may face and/or may be in communication with the pressure plates of a corresponding brake pad. For example, one or more brake pistons may be in contact with the pressure plate of an inboard brake pad, one or more brake pistons may be in contact with the pressure plate of an outboard brake pad, one or more fingers may be in contact with the pressure plate of an outboard brake pad, or a combination thereof. During a standard brake apply, or while applying the parking brake, the one or more brake pistons and/or the one or more fingers may push, pull, or otherwise move all or an end of a corresponding brake pad so that the corresponding friction material engages a corresponding side of the brake rotor to create the clamping force.

The brake caliper may have one or more caliper bores. Each caliper bore may define a hollow region in the brake caliper. The caliper bore may be adapted to receive and support a corresponding brake piston. One or more caliper bores can be located on each side of the brake rotor (e.g., inboard side and outboard side). A brake piston supported within a caliper bore may be moved along an axis of the caliper bore to create or release a clamp force during application of the service brake, the parking brake, or both.

The one or more brake pistons may function to move a brake pad, or a corresponding end of brake pad, towards the brake rotor to create the clamp force. During a brake apply to decelerate or stop a vehicle, the brake pistons may be moved by pressurizing a fluid, such as brake fluid. To release the clamp force or the brake apply, the brake piston can be moved by depressurizing the fluid. During a parking brake apply, to create clamp force, the same brake piston used during a brake apply may be moved by moving a corresponding rotary to linear stage mechanism in an apply direction. To release the clamp force or the parking brake, the brake piston can be moved by moving the corresponding rotary to linear stage mechanism in an opposing release direction. During both a parking brake apply and a standard brake apply, the brake piston may be moved along a brake piston axis, which may be collinear or essentially collinear with the piston bore axis. The brake piston may include a closed end selectively engaging the pressure plate of a brake pad, and an open end defining an opening into a piston bore.

The piston bore may function to receive at least a portion of the parking brake system. The piston bore may receive at least a portion of the rotary to linear stage mechanism. One or more of the brake pistons may include a piston bore.

The piston bore may be a cup or recess formed into an end of a brake piston. The piston bore may include a surface at or near a bottom wall or end of the piston bore. A gap may be defined between a corresponding surface on the nut and the surface at the bottom wall. During a parking brake apply, the gap may be taken up by moving the rotary to linear stage mechanism in an apply direction towards the inboard brake pad. Once the gap is taken up, further movement of the rotary to linear stage mechanism or nut sleeve may cause the rotary to linear stage mechanism to press against the bottom wall and then move the brake piston and the brake pad against the brake rotor to create the clamp force.

Figure 1B:
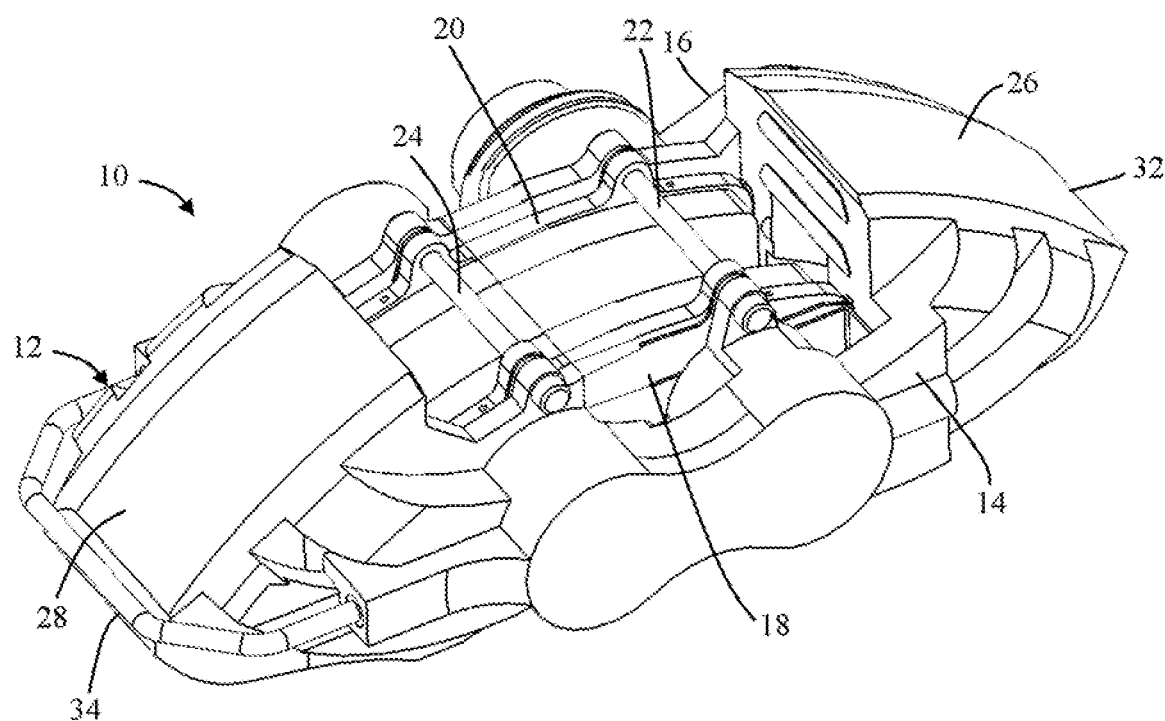
FIG. 1B is a perspective view of a brake system.

FIGS. 1A and 1B illustrate a brake system 10. The brake system 10 comprises a brake caliper 12. The brake caliper 12 comprises a first side 14 and a second side 16. The first side 14 is the inboard side of the brake caliper 12, and the second side 16 is the outboard side of the brake caliper 12. The brake system 10 is an opposed piston brake system. This means one or more brake pistons are supported in the first side 14 of the brake caliper 12, and one or more brake pistons are supported in the second side 16 of the brake caliper 12.

A first brake pad 18 is supported at the first side 14 of the brake caliper 12, and a second brake pad 20 is supported at the second side 16 of the brake caliper 12. The brake pads 18, 20 may be supported on pins 22, 24 that are supported at each of the sides 14, 16 of the brake caliper 12. One or both of the pins 22, 24 may extend through hooks or loops or ears extending from a top end and/or side end (leading/trailing end) of the brake pad or pressure plate. Additionally, or alternatively, one or more of the pins may be provided through bores or apertures defined in the pressure plate in between pad or friction material sections, like illustrated in FIG. 1C. During a brake apply, the one or more brake pistons supported on the first side 14 of the brake caliper 12 are configured to be moved, causing the first brake pad 18 to move towards and against a brake rotor located between the sides 14, 16 of the caliper 12 to create clamping force. The one or more brake pistons supported on the second side 16 of the brake caliper 12 are also configured to be moved, causing the second brake pad 20 to be moved towards and against the opposing side of the brake rotor to create clamping force.

While the brake system 10 of FIGS. 1A and 1B includes two pins 22, 24, the system 10 may include more than two pins. For example, the brake system 10 may include three or more pins, four or more pins, five or more pins, etc. The pins 22, 24 may be used to support the brake pads 18, 20 and assist in servicing or changing or replacing the brake pads 18, 20.

Figure 1C:
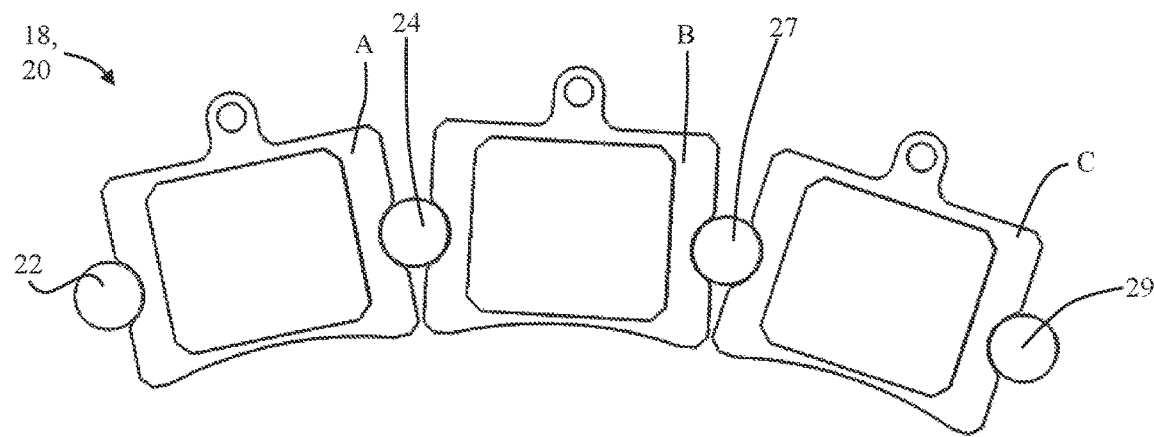
FIG. 1C is a front view of a brake pad.

For example, referring to FIG. 1C, the system may include four pins 22, 24, 25, 27. Such a configuration may be used, for example, when the brake pad 18, 20 comprises three individual or discrete brake pad sections A, B, C, where each brake pad section comprises a pressure plate and friction material. One or more of the brake pad sections A, B, C may be used during application of the service brake, and one or more of the brake pad sections A, B, C may be used during application of the parking brake. In other words, some or all of the brake pad sections A, B, C may be used during a brake apply and some or all of the brake pad sections A, B, C may be used during a brake apply. The pins 22, 24, 27, 29 may be used to support the pad sections A, B, C.

In some configurations, five or more pins, six or more pins, three or more, etc. may be used. For example, brake pads that have two brake pad sections may have three pins, brake pads with four brake pad sections may have five pins, etc.

Alternatively, the brake system 10 may include less than two pins. For example, the brake system 10 may include only one pin. The one pin may be generally centered between the ends of the brake pads 18, 20. The one pin may be offset or biased towards one of the ends of the brake pads 18, 20. Having less than two pins may reduce weight, cost, and/or assembly or service complexities of the brake system 10. Having less than two pins may also reduce or prevent chances of one or both of the brake pads 18, 20 cocking or jamming while moving towards and away from the brake rotor. In some configurations, the brake system 10 may be free of any pins for supporting the brake pads 18, 20.

Referring back to FIGS. 1A and 1B, at one end of the brake caliper 12, a first wall or bridge 26 extends between and connects the first side 14 and the second side 16. At the opposing end of the brake caliper 12, a second wall or bridge 28 extends between and connects the first side 14 and the second side 16.

Figure 3:
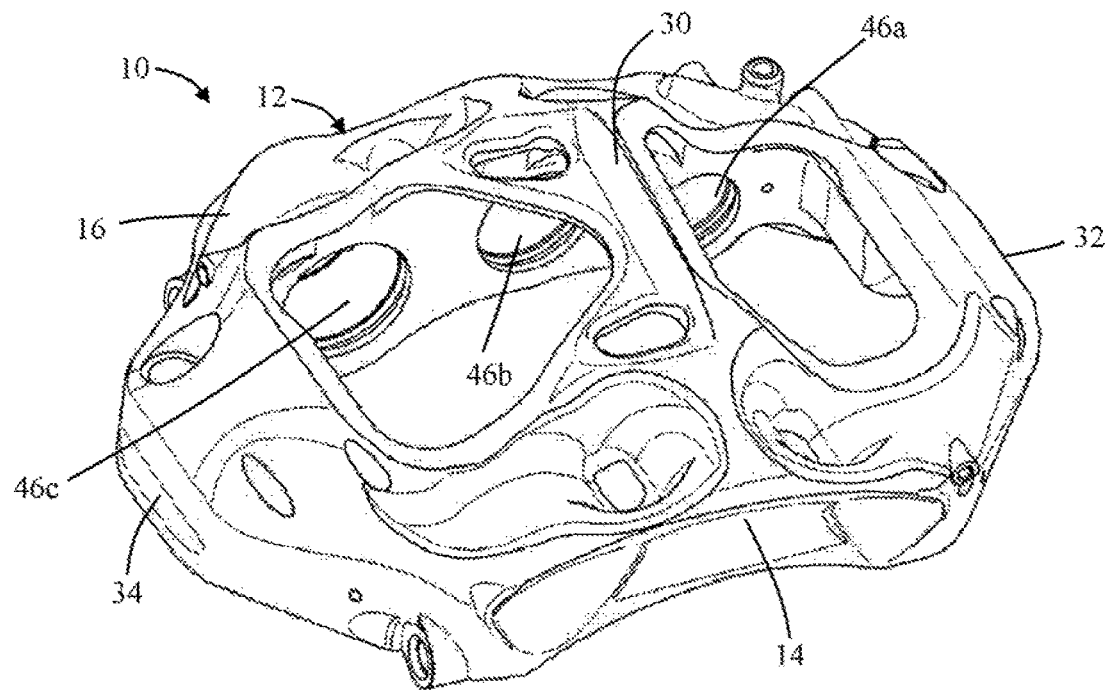
FIG. 3 is a perspective view of another caliper body of the brake system.

The brake caliper 12 in FIG. 1A includes a third wall or bridge 30 that extends between and connects the first side 14 and the second side 16. The third wall or bridge 30 may be located at a center location of the brake caliper 12, for example centered between a first end 32 and an opposing second end 34 of the brake caliper 12. For example, FIG. 3 illustrates a wall or bridge 30 that is generally centered between the ends 32, 34 of the caliper 12. Alternatively, the third wall or bridge 30 may be offset towards one end 32, 34 or the other end 32, 34 of the caliper 12.

The brake caliper 12 in FIG. 1B does not include, or is free of, a wall or bridge like wall or bridge 30 in FIG. 1A. Instead, the center area between walls or bridges 26, 28 is substantially free of any walls or bridges or connecting structures extending between the first and second sides 14, 16 of the caliper 12. This may advantageously reduce material cost of the brake caliper 12; may reduce a weight of the caliper 12 and brake system 10; may reduce manufacturing and/or assembly complexities of the caliper 12 or system 10; or a combination thereof.

In the above description, first end 32 may be a leading end of the brake caliper 12, and the second end 34 may be the trailing end of the brake caliper 12, or vice versa. In the above description, side 14 may be the outboard side of the brake caliper 12, and side 16 may be the inboard side of the brake caliper 12, or vice versa.

Figure 2:
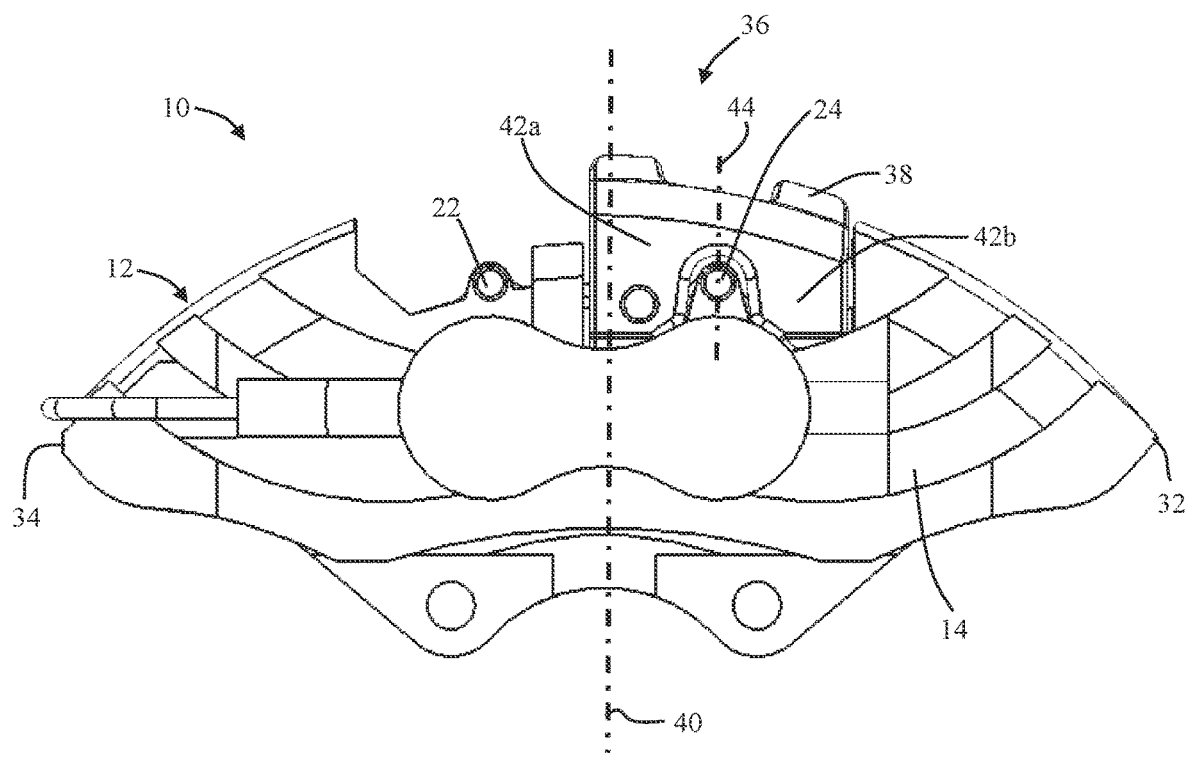
FIG. 2 is a side view of a brake system.

FIG. 2 illustrates a brake system 10, that may include one or more of the features described above in either or both of FIGS. 1A and 1B or in any of other brake systems included, described, or illustrated herein. Therefore, in the interest of brevity, like features will not be described again.

The brake system 10 comprises a parking brake system 36. The parking brake system 36 is a slider-type of brake system. The parking brake system 36 may function and/or include features that are disclosed in Applicant's previously-filed U.S. patent application Ser. No. 15/248,134, filed on Aug. 26, 2016, which is expressly incorporated by reference herein for all purposes. The parking brake system 36 may function and/or includes features of the parking brake system identified by reference numeral 12 in Applicant's aforementioned U.S. patent application Ser. No. 15/248,134.

The parking brake system 36 comprises a bridge 38 that extends over a gap defined between the first and second sides 14, 16 (See FIGS. 1A, 1B for the sides 14, 16) of the caliper 12. As illustrated, the bridge 38 is offset relative to a center plane 40 of the brake system 10. The center plane 40 may be centered between the ends 32, 34 of the brake caliper 12. The parking brake system 36 comprises fingers 42a, 42b that surround pin 24.

Alternatively, the brake system 10 may have a parking brake system 36 that is symmetrically located on the brake system 10. This means that the parking brake system 36 is symmetric about plane 40, for example. This means that the parking brake system 36 and/or bridge 38 is centered about plane 40. More specifically, a center plane or portion 44 of bridge 38 may be aligned with or the same as plane 40. This may mean that the bridge 38 is moved towards end 34 of the brake caliper 12. This may mean that the bridge 38 is configured such that finger 42b remains in substantially the same spot, but finger 42a is moved towards end 34 so that the plane 44 is aligned with or the same as plane 40. This may mean that the bridge 38 is moved or translated towards end 34, and openings or passages are provided in the fingers 42a, 42b for the corresponding pins 22, 24 to pass through the fingers 42a, 42b. This may also mean that the parking brake system 36 is configured to move more than one brake piston that is supported at the second side (e.g., side 16 of FIGS. 1A, 1B) during a parking brake apply, which is described further in FIG. 3. An example of a symmetrical parking brake system 36 is also illustrated at FIG. 8B.

FIG. 3 illustrates a brake system 10, that may include features substantially similar to those described above in one or more of FIGS. 1A-2 or in any of other brake systems included, described, or illustrated herein. Therefore, in the interest of brevity, like features will not be described again.

The brake system 10 of FIG. 3 comprises a brake caliper 12 that includes a first and second side 14, 16. Each side 14, 16 comprises one or more caliper bores. For example, side 16 comprises three caliper bores 46a, 46b, 46c. Side 16 can have more or less than three caliper bores. Side 14 can have any number of caliper bores, for example, more or even less than three caliper bores. The brake system 10 comprises a brake piston inside each of the caliper bores. Each side 14, 16 may have the same number of caliper bores and brake pistons, or a different number of caliper bores and brake pistons.

During a standard brake apply (e.g., service brake) one or more of the brake pistons supported at side 14 of the caliper 12 may be moved and/or one or more of the brake pistons supported at the opposing side 16 of the caliper 12 may be moved. The brake pistons may be moved by pressuring hydraulic fluid and/or with an electromechanical system that comprises an electric motor, spindle, and nut system. Movement of one or more of the brake pistons may result in movement of the corresponding brake pad towards and against a brake rotor.

Figure 4:
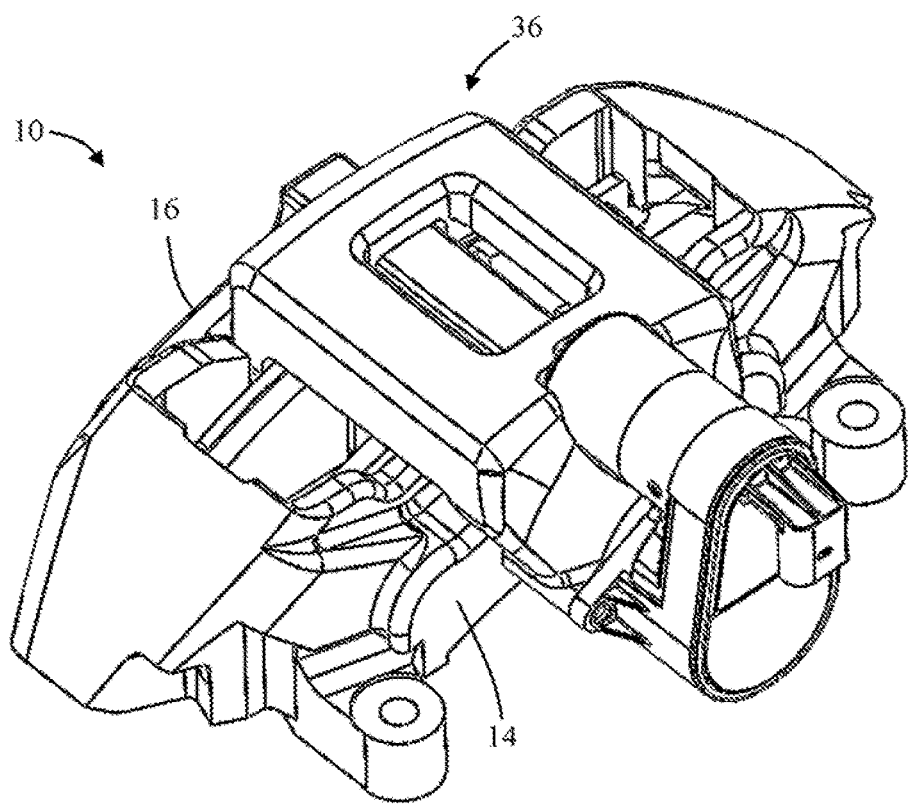
FIG. 4 is a perspective view of a brake system.

Referring to FIG. 4, the brake system 10 comprises a parking brake system 36, that may be similar to the one illustrated and described in FIG. 2 at refence numeral 36. The parking brake system 36 may be configured to move one or more of the brake pistons. For example, the parking brake system 36 may be a sliding caliper system like the one illustrated at FIG. 2 that is configured to move one or more brake pistons supported at side 14 of the caliper 12 and/or one or more brake pistons supported at side 16 of the caliper 12. The parking brake system 36 may be configured to move adjacent brake pistons, for example the brake pistons supported in bores 46a and 46b and/or 46b and 46c in FIG. 3. Alternatively, the parking brake system 36 may be configured to move spaced apart brake pistons, for example, the brake pistons supported in bores 46a and 46c in FIG. 3.

In another configuration, the parking brake system 36 may be configured to move brake pistons located at opposing sides 14, 16 of the caliper 12. For example, the parking brake system 36 may include two parking brake systems, each one of which is configured to move one or more brake pistons on each side 14, 16 of the caliper 12. The parking brake systems 36 can have fingers configured to pull opposing brake pads. For example, one of the parking brake systems can be configured to move one or more brake pistons supported in bores on side 14 of the caliper 12 and fingers configured to pull the brake pad supported at side 16 of the caliper 12. The other parking brake system is configured to move one or more brake pistons supported in bores on side 16 of the caliper 12 and fingers configured to pull the brake pad supported at side 14 of the caliper 12. Such a system may ensure that both brake pads are moved against the brake caliper to create clamping force.

Referring back to FIG. 1A, the brake system 10 comprises pins 22, 24 that are configured to extend between the sides 14, 16 of the brake caliper 12, and support the brake pistons 18, 20. The brake system 10 may comprise any number of pins 22, 24. For example, the system 10 may comprise two pins 22, 24 like shown in FIG. 1A. For example, the system 10 may comprise one pin, or more than 2 pins (e.g., 3 of more pins, 4 or more pins, 5 or more pins, etc.). A cross-section of one or more of the pins 22, 24 may be circular.

In leu of the brake pads moving sliding one or more of the pins 22, 24 during a brake apply or release (whether for service braking or parking braking), the brake pads 18, 20 may be configured to move or slide within the notches or grooves that are configured to support the ears or end so the pressure plate of the brake pads. In other words, one or more of the pins 22, 24 may be eliminated. In such a configuration, the notches or grooves are defined in the first side and the opposing second side of the brake caliper. Each of the brake pads have ears or projections that engage the corresponding grooves. The fit between the ears or projections and the corresponding grooves enables the brake pads to move or slide towards and away from the brake rotor without the need for the pins to support the brake pads during such movement. Advantageously, this may provide for a cost-effective brake system by eliminating the overhead pins and/or may ease or reduce manufacturing and/or assembly complexities.

Figure 5:
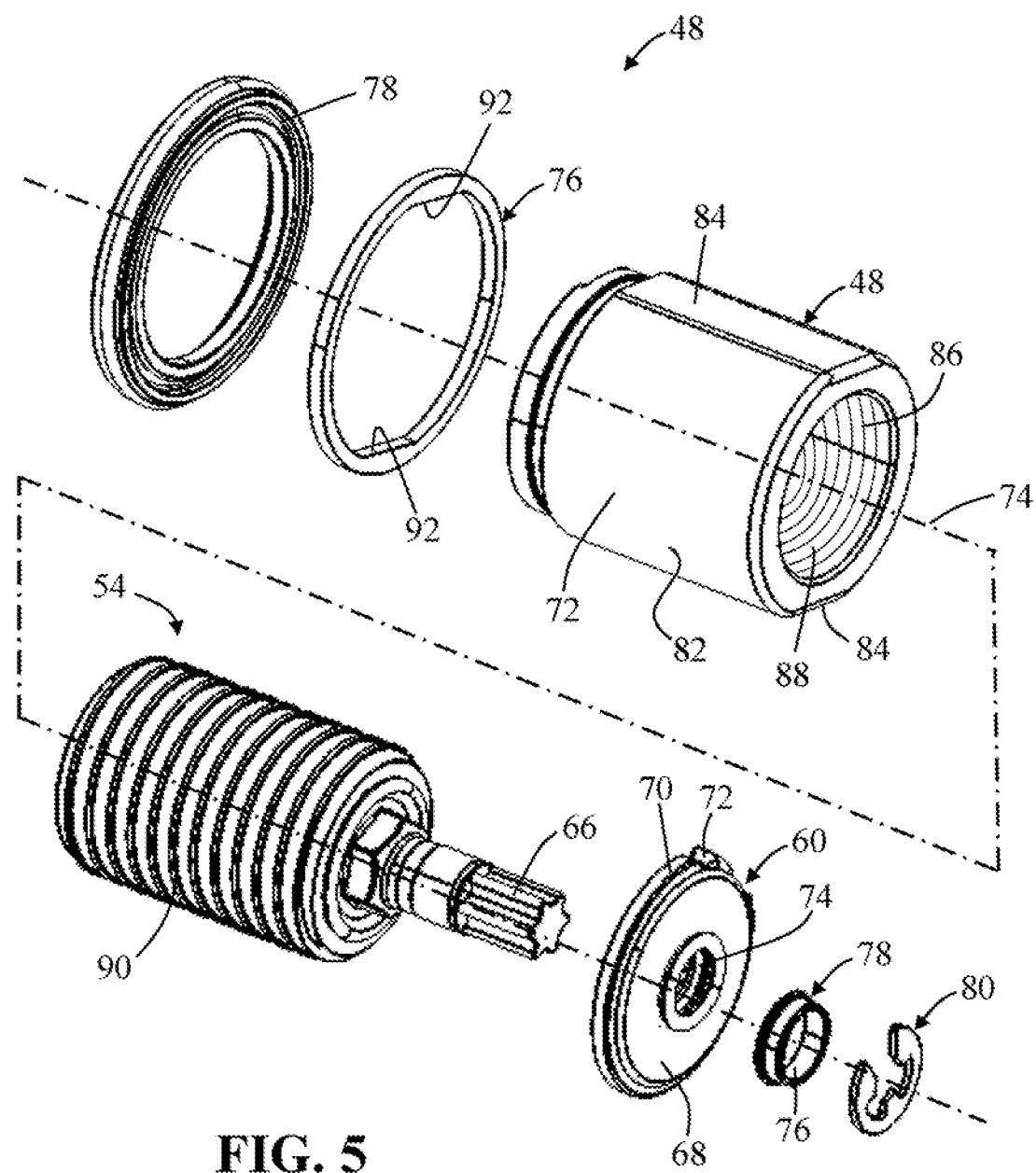
FIG. 5 is an exploded view of a brake piston assembly.

FIG. 5 illustrates a brake piston assembly 48 that comprises a piston body 72 which extends along a longitudinal axis 74; a spindle 54; a piston seal 76; a thrust bearing assembly 60; a spindle O-ring 78; and a retaining clip 80. The brake piston assembly 48 may be configured for use during a standard braking operation (e.g., service brake) or during a parking brake operation. Accordingly, the brake piston assembly 48 may be inserted into one or more of the caliper bores 46 illustrated in FIG. 3, for example, described in any of other brake systems included, described, or illustrated herein.

An outer surface 82 of the piston body 72 comprises an optional pair of anti-rotation features 84 that generally oppose one another. Stated another way, the anti-rotation features 84 are located on opposing sides of the piston body 72. The outer surface 82 of the piston body 72 is generally circular, and the anti-rotation features 84 are generally flat sections relative to the generally circular outer surface 82. The anti-rotation features 84 of the brake piston 48 are adapted to engage or be engaged by corresponding anti-rotation features defined in a caliper bore 46 (FIGS. 3, 6, etc.) of the caliper 12. The anti-rotation features cooperate to restrict or prevent the brake piston 48 from rotating inside the caliper bore 46 about the axis 74.

The piston body 72 comprises a piston pocket 86. The piston pocket 86 is a bore defined in the piston body 72. The piston pocket 86 comprises a threaded portion 88 that is defined or formed directly in the annular wall or side wall defining the piston pocket 86. Alternatively, the threaded portion 88 may be a sleeve or insert that is fit into the piston pocket 86. The threaded portion 88 is adapted to threadably engage a corresponding threaded portion 90 of the spindle 54. Alternatively, the threaded portion 88 may be a groove or track that is configured to cooperate with a corresponding groove or track in the spindle 90 to house or support ball bearings, for example, like a ball nut assembly. The spindle 54 comprises an input portion 66. The input portion 66 of the spindle 54 is adapted to engage a motor or MGU or other source of rotary force or torque so that the spindle 54 can be rotated. Rotation of the spindle 54 about the longitudinal axis 72 causes the brake piston 48 to move axially along the longitudinal axis 40.

The piston seal 76 is a generally annular structure that is adapted to fit around and surround the outer surface 82 of the piston body 82. The piston seal 76 comprises anti-rotation features 92 disposed around an inner diameter thereof. The ant-rotation features 92 generally correspond to and are adapted to engage the corresponding ant-rotation features 84 located on the outer surface 82 of the piston body 72.

Figure 6A:
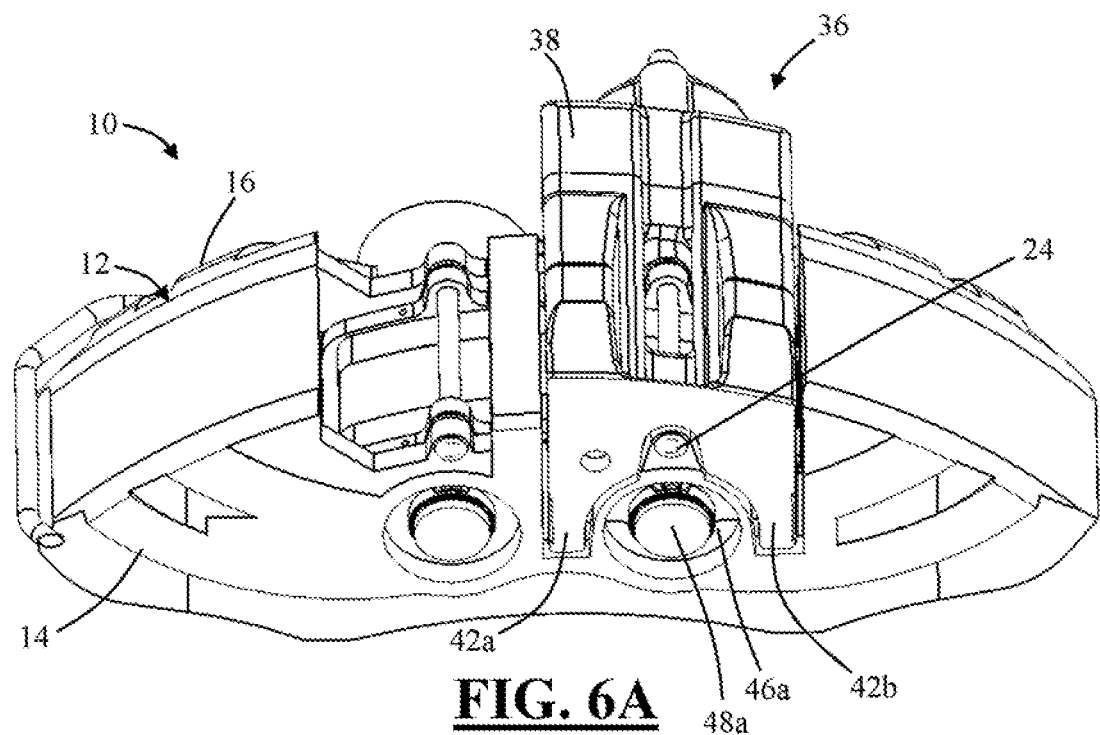
FIG. 6A is a cross-sectional view of a brake system.
Figure 6B:
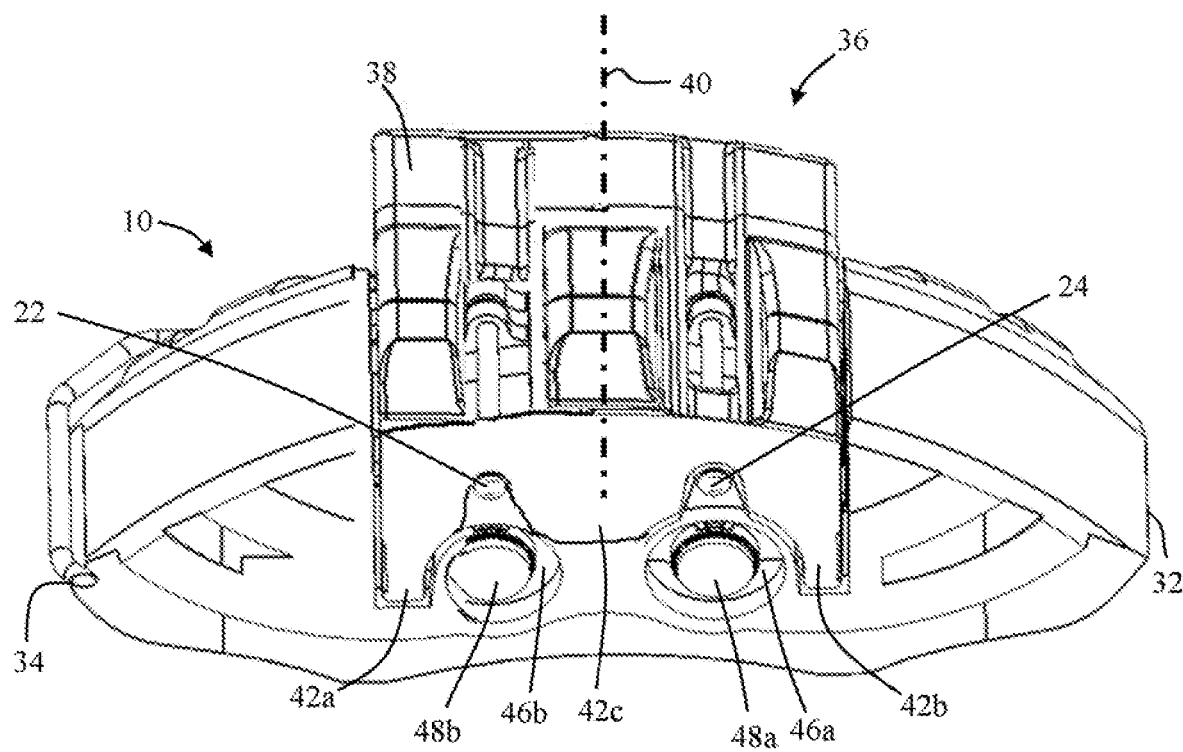
FIG. 6B is a cross-sectional view of a brake system.

FIGS. 6A and 6B illustrate a cross section of the brake system 10 of FIGS. 1A-2. The brake system 10 may include one or more of the features described above or below in any of the figures included herewith. Therefore, similar or like features will not be described again.

The brake system 10 comprises a parking brake system 36. The parking brake system 36 is a slider-type of brake system. The parking brake system 36 may function and/or include features that are disclosed in Applicant's previously-filed U.S. patent application Ser. No. 15/248,134, filed on Aug. 26, 2016, which is expressly incorporated by reference herein for all purposes. More specifically, the parking brake system 36 may function and/or includes features of the parking brake system identified by reference numeral 12 in Applicant's aforementioned U.S. patent application Ser. No. 15/248,134.

Referring to FIG. 6A, the parking brake system 36 comprises a bridge 38 that extends over a gap defined between the first and second sides 14, 16 of the caliper 12. The parking brake system 36 comprises fingers 42a, 42b. The fingers 42a, 42b are configured to surround pin 24 and brake piston 48a that is located or supported in caliper bore 46a.

Referring to FIG. 6B, the fingers 42a, 42b are configured to surround both pins 22, 24 and both brake pistons 48a, 48b. More specifically, finger 42a is located at one side of pin 22 and brake piston 48b, and pin 42b is located at another side of pin 24 and brake piston 48a. a center portion, which may be a finger 42c extends between pins 22, 24 and brake pistons 48a, 48b supported in corresponding caliper bores 46a, 46b.

With continued reference to FIG. 6B, the parking brake system 36 is generally centered on the brake caliper 12. That is, a center portion or plane of the parking brake system 36 is generally centered between the ends of the brake caliper 12.

Figure 7:
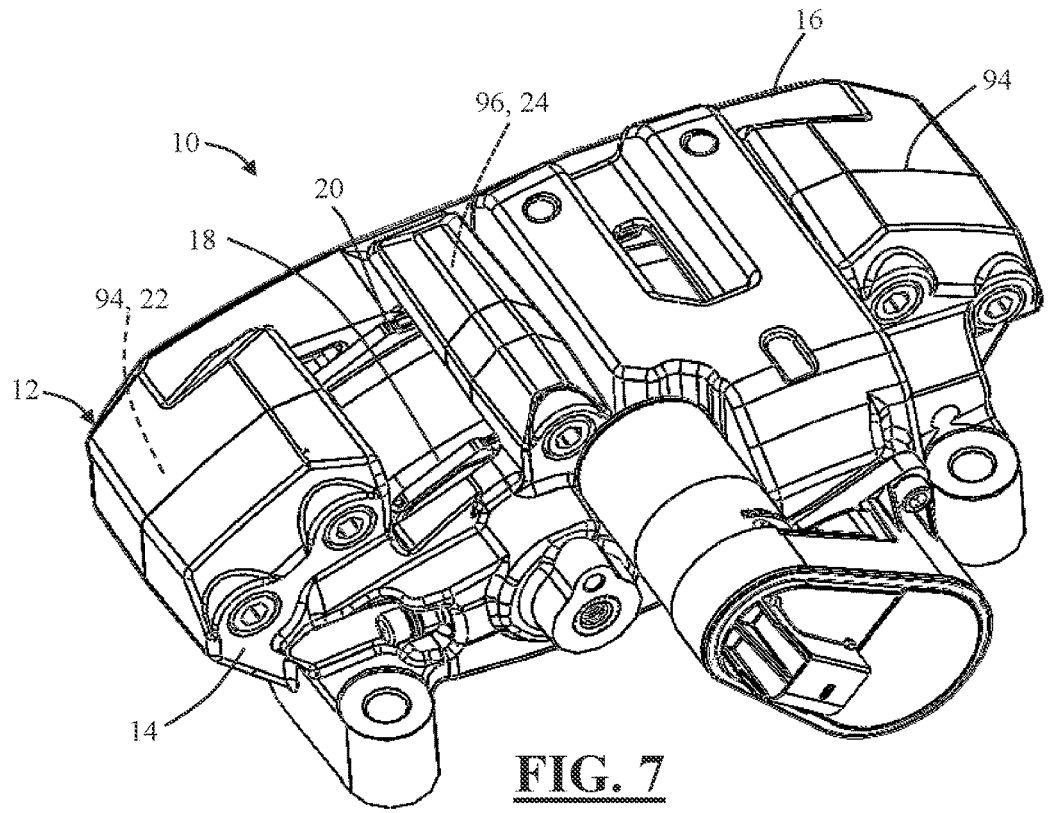
FIG. 7 is a perspective view of a brake system.

FIG. 7 illustrates a brake system 10. The brake system 10 may include one or more of the features described above or below in any of the figures. Therefore, in the interest of brevity, like features will not be described again.

The brake system 10 comprises a brake caliper 12. The brake caliper may be formed as a single, integral component. This means that the brake caliper 12 is manufactured from a single piece that does not need to be subsequently joined together afterwards.

Alternatively, the brake caliper may be made of two or more pieces. For example, the brake caliper may be made of two or more halves or pieces, which are then joined together at a parting line 94. The two sides 14, 16 may be joined together with suitable fasteners like bolts, screws, welding, etc. For example, the first side 14 and the second side 16 may be separate discrete pieces, which are then joined together. The first and second sides 14, 16 may be mirror images of each other. Alternatively, the first and second sides 14, 16 may be different from each other. Different means that the first side 14 may be thicker or thinner than the other side and/or may have geometry that is different than the second side 16 (e.g., not mirror image). Additionally, or alternatively, the brake caliper may comprise two or more sections or pieces that are joined together at a parting line that is angled relative to the line illustrated at 94. For example, the line may be perpendicular to line 94, or the line may be at an angle that is acute or obtuse to line 94. A brake caliper 12 that is made of two or more sections or portions that are subsequently joined together may be advantageous in that the sections may be made of different materials; manufacturing complexities may be reduced or eliminated; or both.

With continued reference to FIG. 7, if the caliper body 12 comprises two halves or sides 14, 16 that are separated at parting line 94, the two halves 14, 16 may be joined together with one or more bolts 94, 96 (two bolts shown). In addition to connecting the two halves together 14, 16, one or more of the bolts 94, 96 may also function as sliding pins 22, 24 for the inboard and outboard brake pads 18, 20 to move or slide along. The brake system 10 may include one or more of the features described above or below in any of the figures. Therefore, in the interest of brevity, like features will not be described again.

Having a caliper body 12 comprises of two or more halves may be advantageous in that complex geometries can be manufactured, which may be difficult or costly to form if the caliper body 12 is constructed of a single construction. Moreover, scrap in the manufacturing process may be reduced by being able to salvage and join together halves of the caliper body 12. In some configurations, the caliper body 12 may be strengthened via the bolts holding the halves of the caliper body 12 together.

Figure 8:
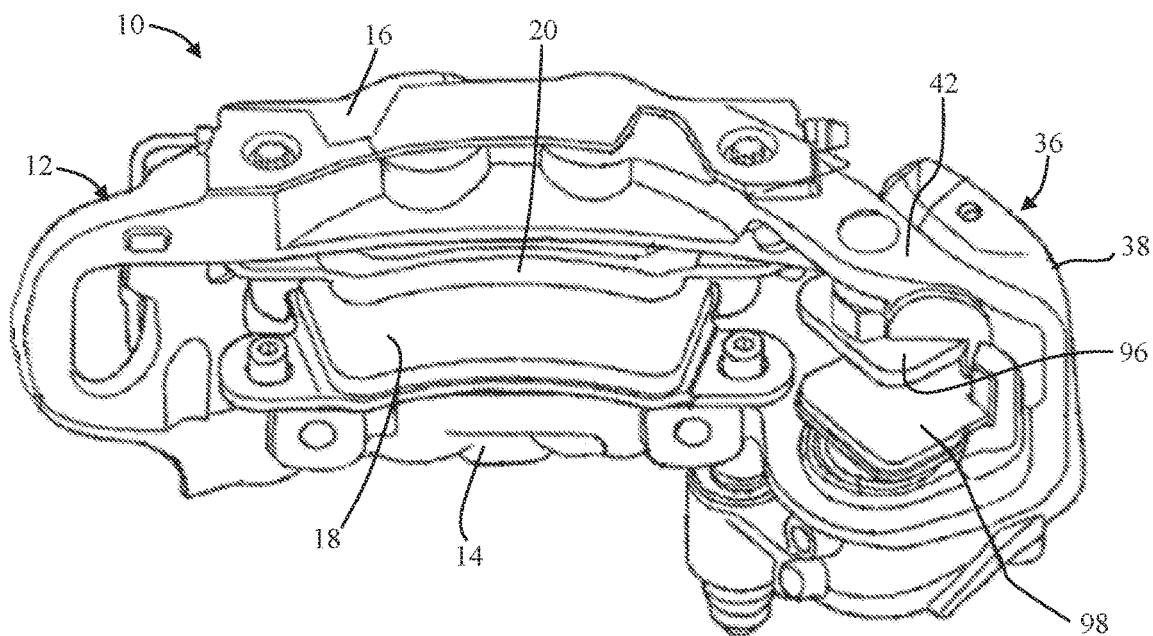
FIG. 8 is a perspective view of a brake system.

FIG. 8 illustrates a brake system 10. The brake system 10 may include one or more of the features described above or below in any of the figures. Therefore, in the interest of brevity, like features will not be described again.

The brake system 10 comprises a brake caliper 12 that includes a first side 14 and an opposing second side 16. The brake system 10 is an opposed piston brake system. This means one or more brake pistons are supported in the first side 14 of the brake caliper 12, and one or more brake pistons are supported in the second side 16 of the brake caliper 12.

A first brake pad 18 is supported at the first side 14 or inboard side of the brake caliper 12, and a second brake pad 20 is supported at the second side 16 or outboard side of the brake caliper 12. During a brake apply, the one or more brake pistons supported on the first side 14 of the brake caliper 12 are configured to be moved, causing the first brake pad 18 to move towards and against a brake rotor located between the sides 14, 16 of the caliper 12 to create clamping force. At the same time, the one or more brake pistons supported on the second side 16 of the brake caliper 12 are configured to be moved, causing the second brake pad 20 to be moved towards and against the opposing side of the brake rotor to create clamping force.

The brake system comprises a parking brake system 36. The parking brake system 36 may be a spot caliper that includes a bridge 38 and fingers 42. The bridge 38 may be connected to the brake caliper 12. For example, the bridge 38 may be connected to the first side 14, the second side 16 of the brake caliper 12, or both sides 14, 16 of the caliper 12. When the brake system 10 is mounted to a vehicle, the bridge 38 is configured to straddle or at least partially surround a brake rotor (not illustrated) just like how the sides 14, 16 of the brake caliper 12 are configured to straddle or at least partially surround the brake rotor. The parking brake system 36 may extend from a leading end of the brake caliper 12 or the training end of the brake caliper. For example, the parking brake system 36 may be configured to move one or more brake pad sections A, B, C, illustrated in FIG. 1C. Alternatively, while not illustrated, a parking brake system 36 may be located at both ends of the brake caliper 12 (i.e., the brake system comprises a parking brake system at both ends of the brake caliper). The parking brake system 36 may be located in the middle of the caliper, between the leading and trailing ends of the brake caliper and configured to move one or more pad sections of the brake pad, like brake pad section B illustrated in FIG. 1C, for example. An outboard brake pad 96 located adjacent the fingers 42, and an inboard brake pad 98 is located adjacent a brake piston (not illustrated). The parking brake system 36 may be configured such that the fingers pull or draw the outboard brake pad 96 against the rotor to create the clamping force, or the parking brake system 36 may flipped such that the fingers 42 are configured to pull the inboard brake pad 98 against the brake rotor to create the clamping force.

The parking brake system 36 may be used to create a clamping force during a parking brake application, and the brake system 10 may be used to create a clamping force during application of the service brake, or vice versa.

Figure 9:
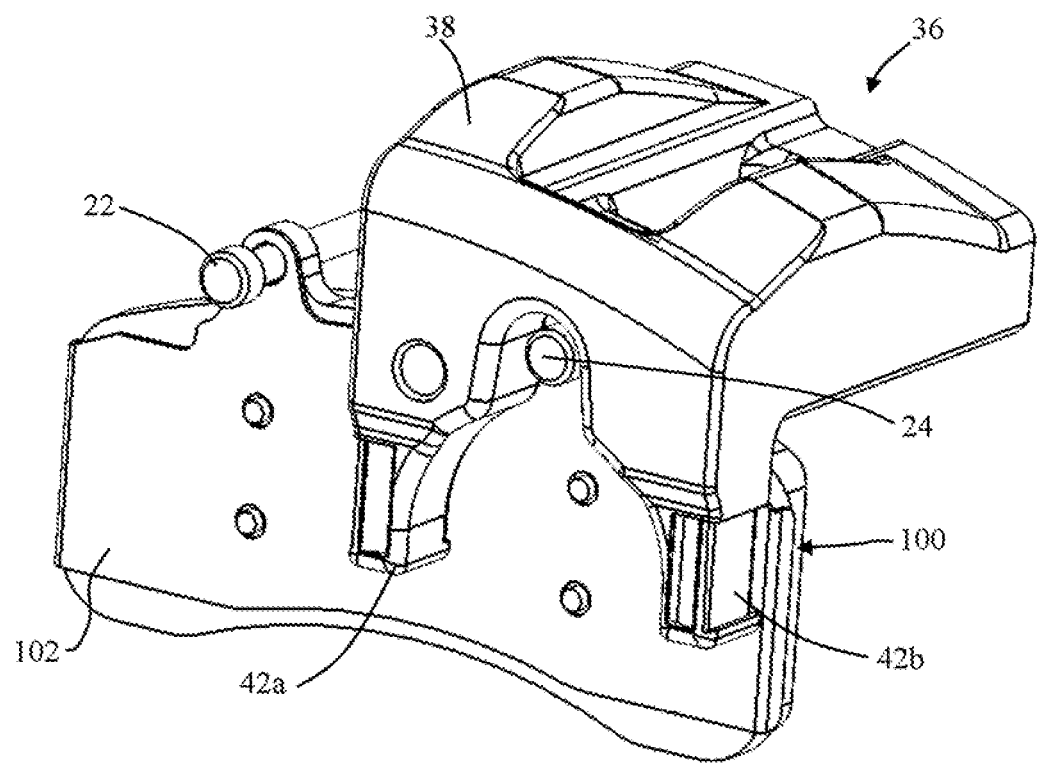
FIG. 9 is a perspective view of a portion of a parking brake system and brake pad.

FIG. 9 illustrates a portion of the parking brake system 36 that may be used with any of the brake calipers 12 disclosed herein. The parking brake system 36 comprises a bridge 38 and 42a, 42b. The fingers 42a, 42b are configured to surround pin 24. In some configurations, the fingers 42a, 42b may surround only pin 22, or may surround both pins 22, 24, like in FIG. 8B.

The fingers 42a, 42b are in contact with a brake pad 100. More specifically, the fingers 42a, 42b are in contact with a pressure plate 102 of the brake pad 100. The fingers 42a, 42b may be integrally-formed with the pressure plate, 102 or attached to the pressure plate 102 with mechanical fasteners like screws, bolts, an adhesive, or a combination thereof.

In some configurations, the bridge 38 may be free of fingers 42a, 42b, and instead, the brake pad 100 may be connected directly to the bridge 38.

Figure 10:
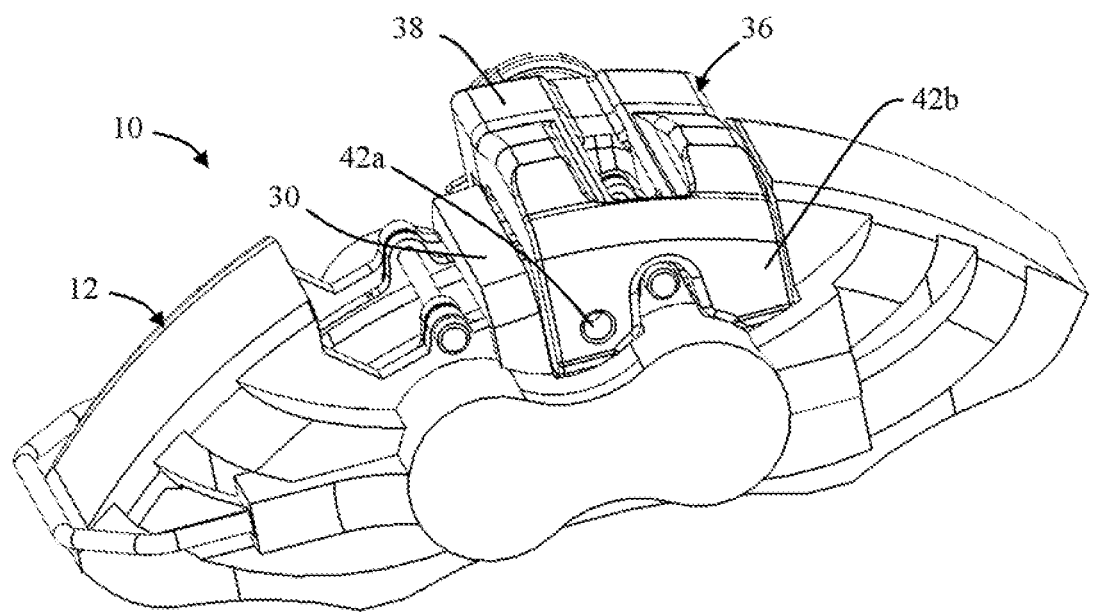
FIG. 10 is a perspective view of a brake system.

FIG. 10 illustrates a brake system 10. The brake system 10 comprises a brake caliper 12 and a parking brake system 36. The brake caliper 12 and the parking brake system 36 may be like one or more of the systems described herein. Therefore, in the interest of brevity like components or elements will not be described.

The brake caliper 12 including the bridge 30 may be made of a suitable material like steel or aluminum. Additionally, or alternatively, the brake caliper 12 and/or the bridge 30 may be made of a phenolic plastic, aluminum or steel. Use of a phenolic material may be advantageous to reduce heat transfer and corrosion, while reducing an overall weight of the system 10. Some non-load bearing portions of the brake caliper 12 may be made of a carbon fiber material.

Similarly, the parking brake system 36 including the bridge 48 and/or fingers 42a, 42b may be made of a suitable material like steel or aluminum. Additionally, or alternatively, the parking brake system 36, the bridge 48, and/or fingers 42a, 42b may be made of a phenolic plastic, aluminum or steel. Use of a phenolic material may be advantageous to reduce heat transfer and corrosion, while reducing an overall weight of the system 36. Some non-load bearing portions of the parking brake system 36 may be made of a carbon fiber material.

The parking brake system may also comprise a motor gear unit (MGU hereafter). The MGU may comprise an electric motor and optionally one or more gears that are configured to increase or decrease a torque output from the motor. The MGU may be configured to move the one or more brake pistons and thus brake pads during a braking event, whether for parking or service, or both. One MGU may be configured to produce sufficient torque to move one or more of the brake pistons. Alternatively, the parking brake system may comprise multiple MGU. For example, it may be advantageous to have a parking brake system that includes a dedicated MGU for each brake piston. Such a configuration would ensure all of the brake pistons are sufficiently moved to create the clamping force. Because the parking brake system in these configurations is a sliding-type of system, the MGU may be attached to a top of the bridge, or even to an end of the bridge. In such a configuration, the MGU may be configured to move or slide with the bridge or fingers during a braking event.

Figure 11:
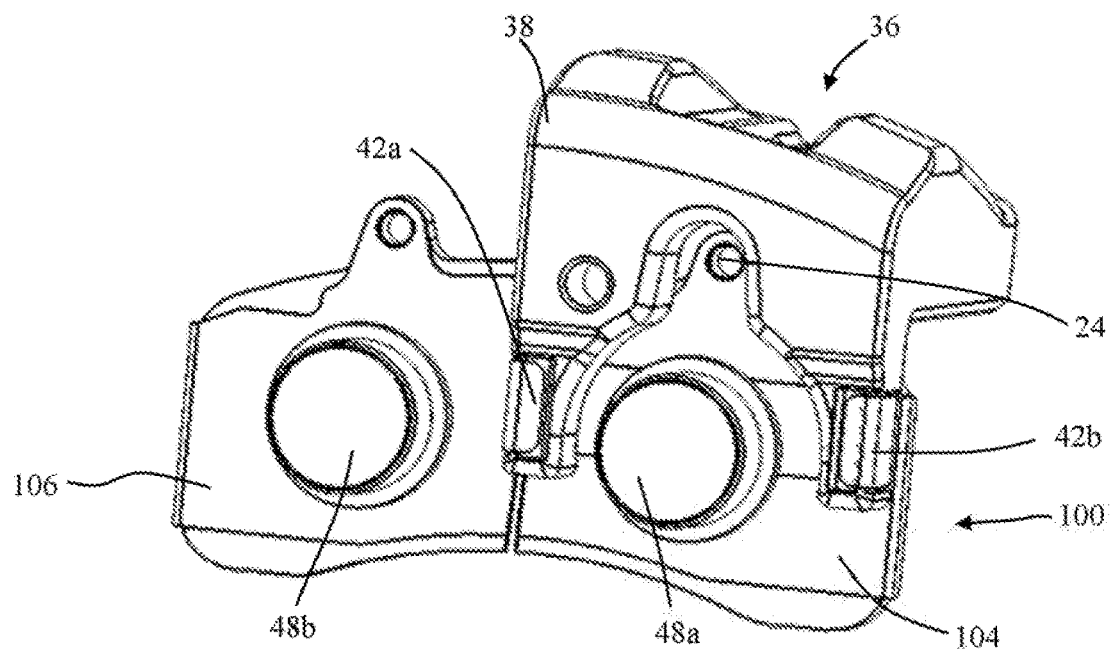
FIG. 11 is a perspective view of a portion of a parking brake system and brake pad.
Figure 15:
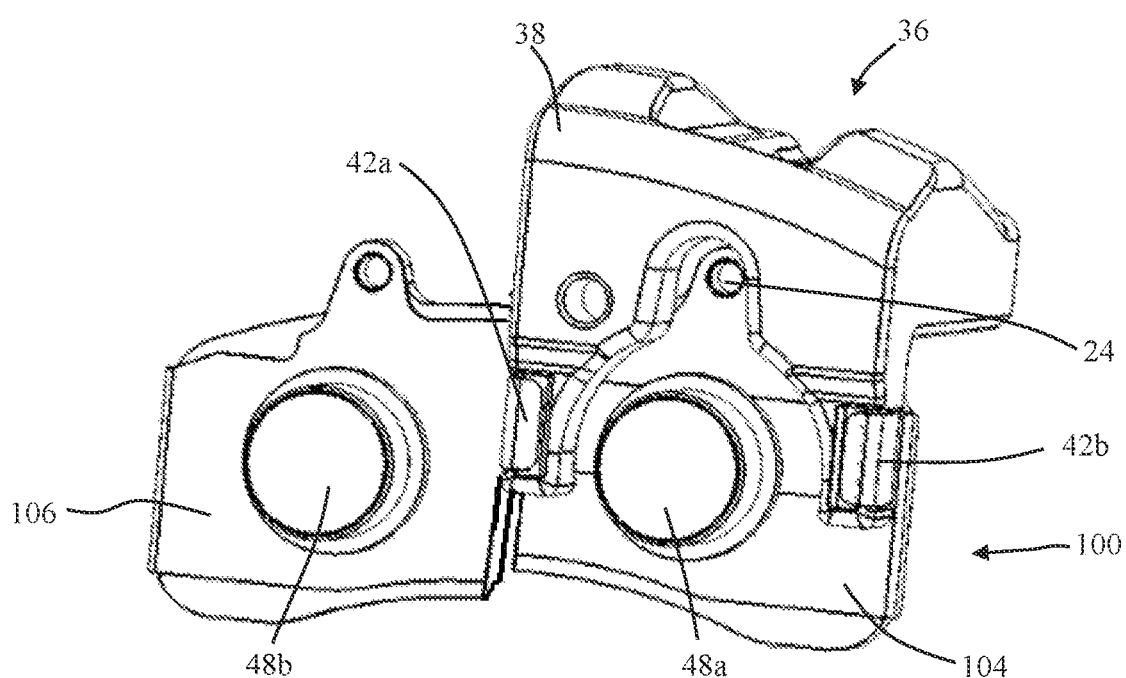
FIG. 15 is a perspective view of a portion of a parking brake system and brake pad.

FIG. 11 illustrates a portion of the parking brake system 36. The parking brake system comprises a bridge 38 and fingers 42a, 42b. The fingers 42a, 42b are in contact with a brake pad 100. The brake pad 100 is a two-piece brake pad, comprising a first piece or pad section 104 and a second piece or pad section 106. The fingers 42a, 42b are in contact with the pressure plate of the first piece 104 of the brake pad 100. During a brake apply, both pistons 48a, 48b may move both of the pad sections 104, 106 against a brake rotor to create the clamping force. With additional reference to FIG. 15, during a parking brake apply, the fingers 42a, 42b may pull only the pad section 104 against the brake rotor to create the clamping force.

Figure 12:
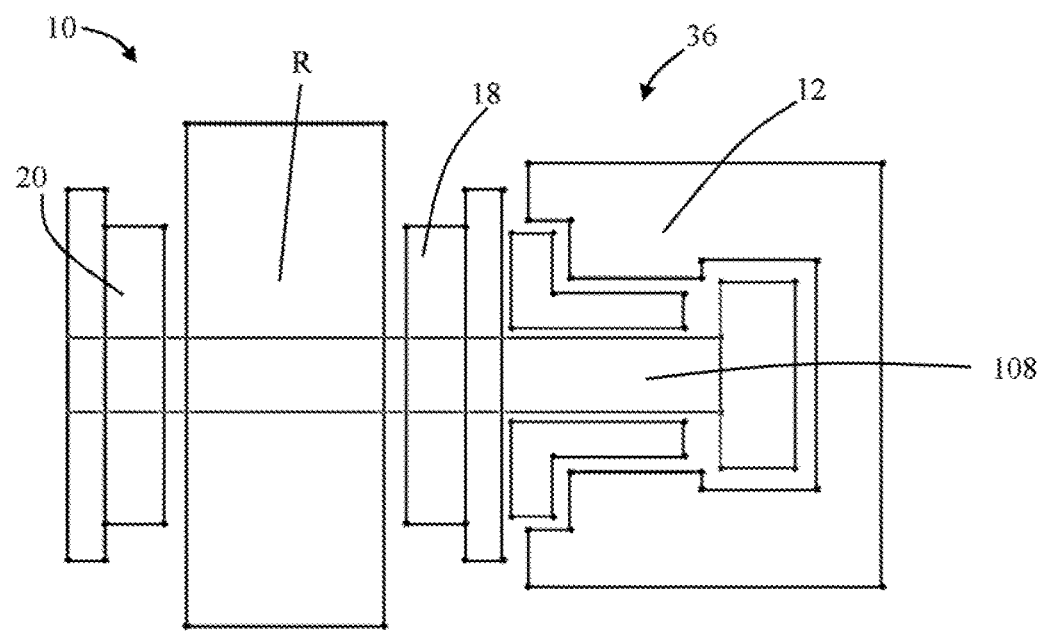
FIG. 12 is a cross-sectional view of a brake system.

FIG. 12 illustrates a top section view of a brake system 10. The brake system 10 comprises an inboard brake pad 18, an outboard brake pad 20, a rotor R between the two brake pads 18, 20. The brake system 10 comprises a parking brake system 36 that includes a shaft 108. The shaft 108 extends either through the brake rotor R, or above the brake rotor R and is connected to the outboard brake pad 20. During a brake apply or a parking brake apply, rotation of the shaft 108, by way of a motor or MGU, causes the outboard brake pad 20 to move towards the brake rotor R to create the clamping force. The inboard brake pad 18 may be moved toward the opposing side of the brake rotor R by way of the same shaft 108. This means that the end or portion of the shaft 108 that connects to the outboard brake pad 20 is treaded in reverse or opposite the end or portion of the shaft 108 that connects to the inboard brake pad 18.

Figure 13:
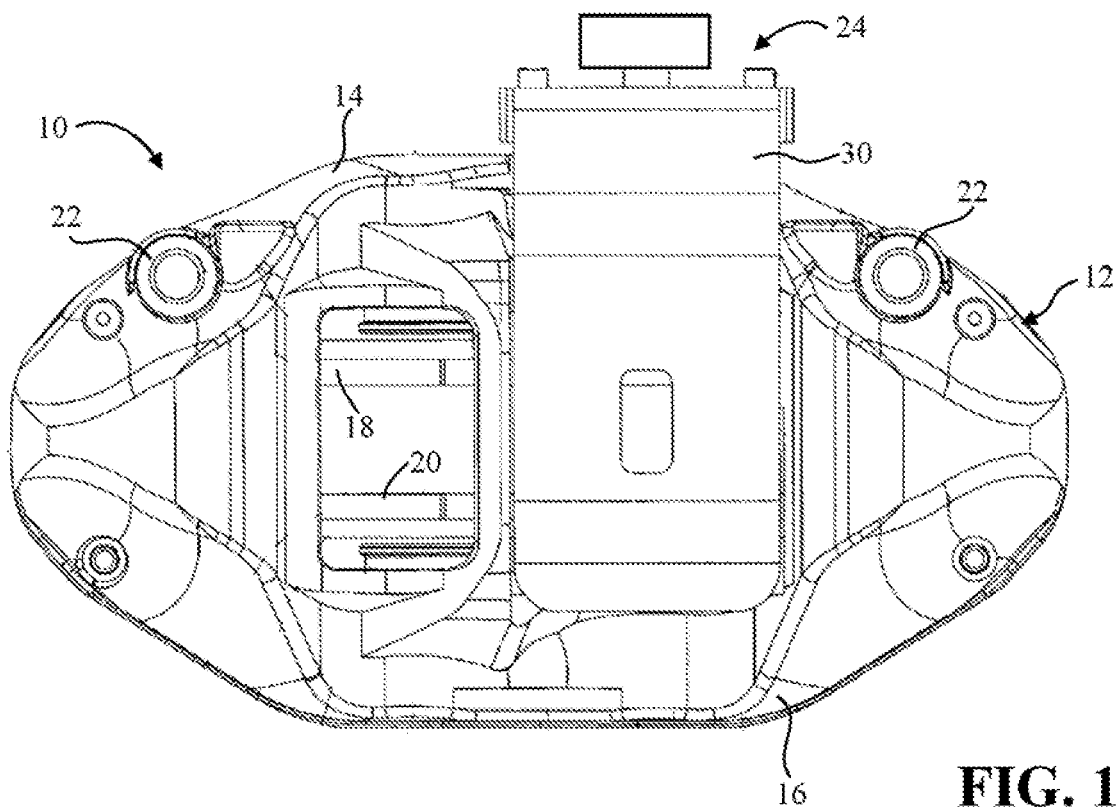
FIG. 13 is a top view of a brake system.

FIG. 13 illustrates a brake system 10. The brake system 10 comprises a brake caliper 12 that includes an inboard side 14 and an opposing outboard side 16. The brake caliper 12 is configured to support an inboard brake pad 18 and an opposing outboard brake pad 20. The inboard and outboard brake pads 18, 20 are configured to be supported on opposite sides of a brake rotor. The brake caliper 12 comprises mounting features 22 for attaching the brake caliper 12 to a fixed portion of a vehicle, like a knuckle. The brake system 10 comprises a parking brake system 24.

Figure 14:
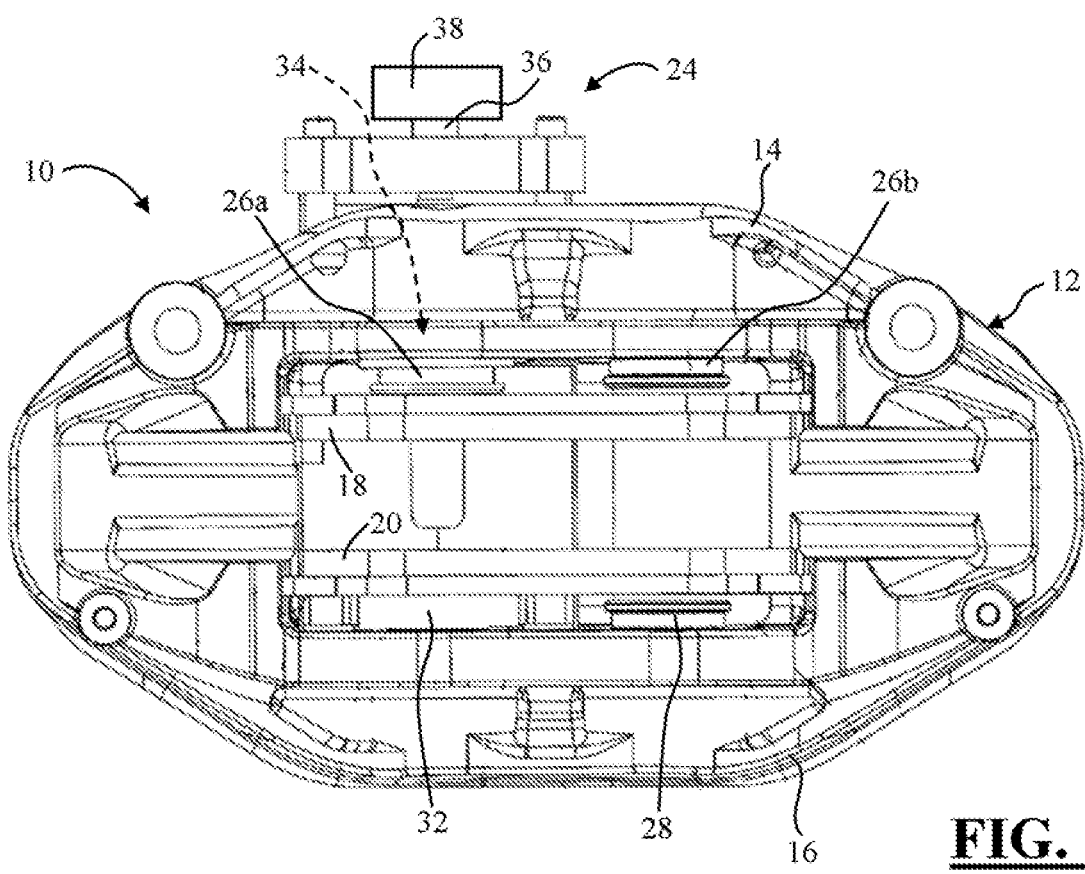
FIG. 14 a bottom view of the brake system of FIG. 13.

Referring now to FIG. 14, the brake system 10 comprises more brake pistons located or supported at the inboard side 14 of the brake caliper 12 than at the outboard side 16 of the brake caliper. For example, the brake system 10 may include two inboard brake pistons 26a, 26b supported in corresponding caliper bores defined in the inboard side 14 of the brake caliper 12. The brake system 10 may comprise one outboard brake piston 28 supported in a caliper bore defined in the outboard side 16 of the brake caliper 12. The brake system 10 is free of an outboard brake piston supported on the outboard side 16 of the brake caliper 12 that is located directly across from the inboard brake piston 26a supported on the inboard side 14 of the brake caliper 12.

While the outboard brake piston 28 is illustrated to be exactly across from the inboard brake piston 26b, the outboard brake piston 28 may be moved or shifted towards either the leading or trailing edge of the brake caliper 12. In some configurations, the outboard brake piston 28 may be located exactly in between the leading and trailing edge of the brake caliper 12. In some configurations, the outboard brake piston 28 may be centered on the outboard brake pad 20.

During a service brake apply to create a clamping force to slow, stop, or prevent movement of the brake rotor, brake fluid is pressurized and then supplied to the inboard brake pistons 26a, 26b, which causes the inboard brake pistons 26a, 26b to move out of their corresponding caliper bores and move the inboard brake pad 18 against the corresponding side of the brake rotor to generate friction. The pressurized brake fluid is also supplied to the outboard brake piston 28, which causes the outboard brake piston 28 to move out of its corresponding caliper bores and move the outboard brake pad 20 against the corresponding side of the brake rotor to generate friction. The pressurized fluid will also act on the bottom of the sliding caliper or bridge 30 and push the fingers 32 against the outboard brake pad 20 and against the outboard side of the brake rotor. The friction generated by the inboard and outboard brake pads 18, 20 pressed against the side of the brake rotor is the clamping force that functions to slow, stop, or prevent movement of the brake rotor and thus the vehicle wheel.

To release clamping force to allow movement of the brake rotor and vehicle, the brake fluid is depressurized so that the inboard brake pistons 26a, 26b move back into their corresponding caliper bores thus allowing the inboard brake pad 18 to move away from and thus out of contact with and the corresponding side of the brake rotor. Depressurized the brake fluid also allows the outboard brake piston 28 to back into its corresponding caliper bore thus allowing the outboard brake pad 20 to move out away from and out of contact with the corresponding side of the brake rotor. Depressurizing the brake fluid also allows the fingers 32 of the sliding caliper or bridge 30 to move away from the outboard brake pad 20 so that the outboard brake pad 20 can move away from and out of contact with the outboard side of the brake rotor.

Referring to both FIGS. 13 and 14, the parking brake system 12 comprises a bridge 30 that spans or extends over the inboard and outboard sides 14, 16 of the brake caliper 12. A grasping member of finger 32 extends from the bridge and is configured to engage the outboard brake pad 20.

The parking brake system 24 comprises a rotary to linear stage mechanism 34 that comprises a spindle and nut. The spindle comprises an outer threaded portion that is configured to engage an inner threaded portion of the nut. The spindle and nut are received inside a pocket of the inboard brake piston 26a. The spindle comprises an input portion 36 that is in communication with a torque generating feature 38 that is configured to generate torque. The torque from the torque generating feature 38 is configured to rotate the spindle, which causes the nut to move axially within the pocket of the inboard brake piston 26a. The torque generating feature may be a motor, a motor gear unit (MGU), or a cable pull that is configured to rotate a shaft or actuator.

During a parking brake apply to create clamping force to prevent movement of the brake rotor and vehicle, the torque generating feature 38 is configured to generate torque in an apply direction, which causes the spindle to rotate in an apply direction. The nut is restricted or prevented from rotating inside the pocket of the inboard brake piston 26a.

Instead, when the spindle is rotated, the nut is configured to axially move. When the spindle is rotated in an apply direction, the nut is configured to axially move in an apply direction until the nut contacts a bottom wall or surface of the piston pocket of the inboard brake piston 26a. Continued rotation of the spindle in the apply direction and thus movement of the nut in the apply direction causes the nut to move or push the inboard brake piston 26a and ultimately the inboard brake pad 18 into contact with the side of the brake rotor to generate friction. A reacting force is generated by this pressing of the inboard brake pad 18 against the brake rotor, which is transmitted through the bridge 30 such that the grasping member of finger 32 is moved, which thus moves the outboard brake pad 20 into contact with the opposite side of the brake rotor to generate friction. The friction generated by the inboard and outboard brake pads 18, 20 pressed against the side of the brake rotor is the clamping force that functions to prevent movement of the brake rotor and thus the vehicle wheel.

To release the clamping force that was generated by the parking brake apply, the torque generating feature 38 is configured to generate torque in a release direction, which causes the spindle to rotate in a release direction. When the spindle is rotated in the release direction, the nut is configured to axially move in a release direction until the nut is out of contact with the bottom wall or surface of the piston pocket of the inboard brake piston 26a, which thus allows the inboard brake piston 26a to move back into its corresponding caliper bore so that the inboard brake pad 16 can move away from and out of contact with the corresponding side of the brake rotor. The reacting force that was generated by the pressing of the inboard brake pad 18 against the brake rotor is reduced or eliminated, which is transmitted through the bridge 30 such that the grasping member of finger 32 is moved in an opposite direction, which thus moves the outboard brake pad 20 out of contact with the opposite side of the brake rotor to release the friction or clamping force.

In the aforementioned brake system 10, the inboard brake piston 26a functions as a dual use brake piston—for creating clamping force during application of the service brake and for creating the clamping force during application of the parking brake. The other brake pistons 26b, 28 are used for creating clamping force during application of the service brake.

While the brake system 10 is illustrated and described as having more brake pistons located or supported on the inboard side than on the outboard side, in some configurations it may be advantageous and/or desirable to have more brake pistons located or supported on the outboard side than on the inboard side of the brake caliper.

Moreover, while the brake system 10 is illustrated and described as having one more inboard brake piston than outboard brake pistons, in some configurations the brake system may have two more inboard brake pistons than outboard brake pistons, or even three or more, four or more, or even five or more inboard brake pistons than outboard brake pistons. For example, while a ratio of inboard brake pistons to outboard brake pistons in the brake system illustrated and described above is 2:1, in some configurations, the ratio may be 3:1, 4:1, or even 5:1.

The brake system 10 may have more than one inboard brake piston, but the number of inboard brake pistons is less than the number of outboard brake pistons.

While the brake system 10 is illustrated and described as having the inboard brake piston 26a function as the dual use brake piston, it is understood that the other inboard brake piston 26b may instead be the dual use brake piston and the inboard brake piston 26a may be used for creating clamping force during application of the service brake.

While the brake system 10 is illustrated and described as having the inboard brake piston 26a function the dual use brake piston, it is understood that both of the brake pistons 26a, 26b may be dual use brake pistons. In such an alternative brake system, each of the brake pistons 26a, 26b include a corresponding rotary to linear stage mechanism for moving the brake piston 26a, 26b and thus the inboard brake pad 18 against the brake rotor to crate the clamping force. The spindles may be rotated by individual motors or by a single motor with a torque distribution assembly or differential, as has been disclosed by Applicant in various other commonly owned patent applications.

While the brake system 10 is illustrated and described as not having a brake piston located across from the dual use inboard brake piston, it is understood that in some configurations, the outboard brake piston may be located across from the dual use inboard brake piston and no brake piston may be located across from the other inboard brake piston. For example, referring to FIG. 2, in some configurations the outboard brake piston 28 may be located across from the dual use inboard brake piston 26a, and no brake piston may be located across from the other inboard brake piston 26b.

One or more of the features illustrated and/or described in any of the brake systems disclosed herein can be combined, duplicated, substituted, and/or omitted to form one or more brake systems. This means that one or more features from any of the brake and/or parking brake systems disclosed herein can be combined with one or more features or elements from any of the other brake and/or parking brake systems disclosed herein.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A brake system comprising:
a brake caliper comprising an inboard side and an outboard side, the inboard side of the brake caliper comprises one or more brake pistons and the outboard side of the brake caliper comprises one or more brake pistons, and
a brake pad comprising a first pad section and a second pad section,
wherein during a service brake apply, both of the first pad section and the second pad section are moved against a braking surface to create a clamping force, and
wherein during a parking brake apply, only one of the first pad section and the second pad section is moved against the braking surface to create a clamping force.

2. The disc brake system according to claim 1, wherein the brake system comprises a spindle and a nut associated with the one or more brake pistons on the inboard side of the brake caliper.

3. The brake system according to claim 2, wherein parking brake system comprises fingers that are configured to move the only one pad section.

4. The disc brake system according to claim 2, wherein the parking brake system comprises a motor configured to rotate the spindle during the parking brake apply.

5. The brake system according to claim 1, wherein the inboard side has two brake pistons.

6. The brake system according to claim 1, wherein the outboard side has one or more less brake pistons than the inboard side only one brake piston.

7. The brake system according to claim 1, wherein the brake system comprises a parking brake system, the parking brake system comprises a bridge that extends between the inboard side and the outboard side, the bridge comprises fingers that are configured to move the only one of the first pad section and the second pad section against the braking surface.

8. The disc brake system according to claim 1, wherein a pin is located between the first pad section and the second pad section.

9. The disc brake system according to claim 1, wherein the brake pad comprises a third brake section, and each of the first brake section, the second brake section, and the third brake section comprises a discrete friction material.

10. A disc brake system comprising:
a brake caliper;
a brake pad supported by the brake caliper, the brake pad comprises a first pad section and a second pad section; and
a parking brake system comprising a bridge extending across a first side and a second side of the brake caliper, the bridge comprises fingers;
wherein during a service brake apply, both of the first pad section and the second pad section are moved against a braking surface to create a clamping force, and
wherein during a parking brake apply, only one of the first pad section and the second pad section is moved against the braking surface to create a clamping force.

11. The disc brake system according to claim 10, wherein the brake pad comprises a third brake section, and each of the first brake section, the second brake section, and the third brake section comprise discrete pressure plates.

12. The disc brake system according to claim 11, wherein a pin is located between the first pad section and the second pad section and another pin is located between the second pad section and the third pad section.

13. The disc brake system according to claim 10, wherein a pin is located between the first pad section and the second pad section.

14. The disc brake system according to claim 10, wherein the parking brake system comprises a spindle and a nut associated with the one or more brake pistons on the inboard side of the brake caliper, and a motor configured to rotate the spindle during the parking brake apply.

15. An opposed piston disc brake system comprising:
a brake caliper;
a parking brake system comprising a bridge extending across a first side of the brake caliper and a second side of the brake caliper;
a brake pad comprising a first pad section and a second pad section;
wherein during a first brake apply, both of the first pad section and the second pad section are moved against a braking surface, and
wherein during a second brake apply, only one of the first pad section and the second pad section is moved against the braking surface.

16. The opposed piston disc brake system according to claim 15, wherein during the first brake apply, both of the first pad section and the second pad section are moved against the braking surface with one or more brake pistons.

17. The opposed piston disc brake system according to claim 16, wherein during the second brake apply, the only one of the first pad section and the second pad section is pulled against the braking surface with the bridge.

18. The opposed piston disc brake system according to claim 17, wherein the brake system comprises a motor, a spindle, and a nut associated with one of the one or more brake pistons.

19. The opposed piston disc brake system according to claim 15, wherein during the second brake apply, the only one of the first pad section and the second pad section is pulled against the braking surface with the bridge.

20. The opposed piston disc brake system according to claim 15, wherein the brake pad comprises a third pad section, wherein the third pad section is moved during the first brake apply and/or during the second brake apply.

* * * * *